Feb. 1, 1966

H. KROBATH 3,232,288

RESPIRATORY ANALYSIS INSTRUMENT

Filed May 6, 1963

INVENTOR.
HANS KROBATH

BY
Brumbaugh, Free, Graves + Donohue his ATTORNEYS

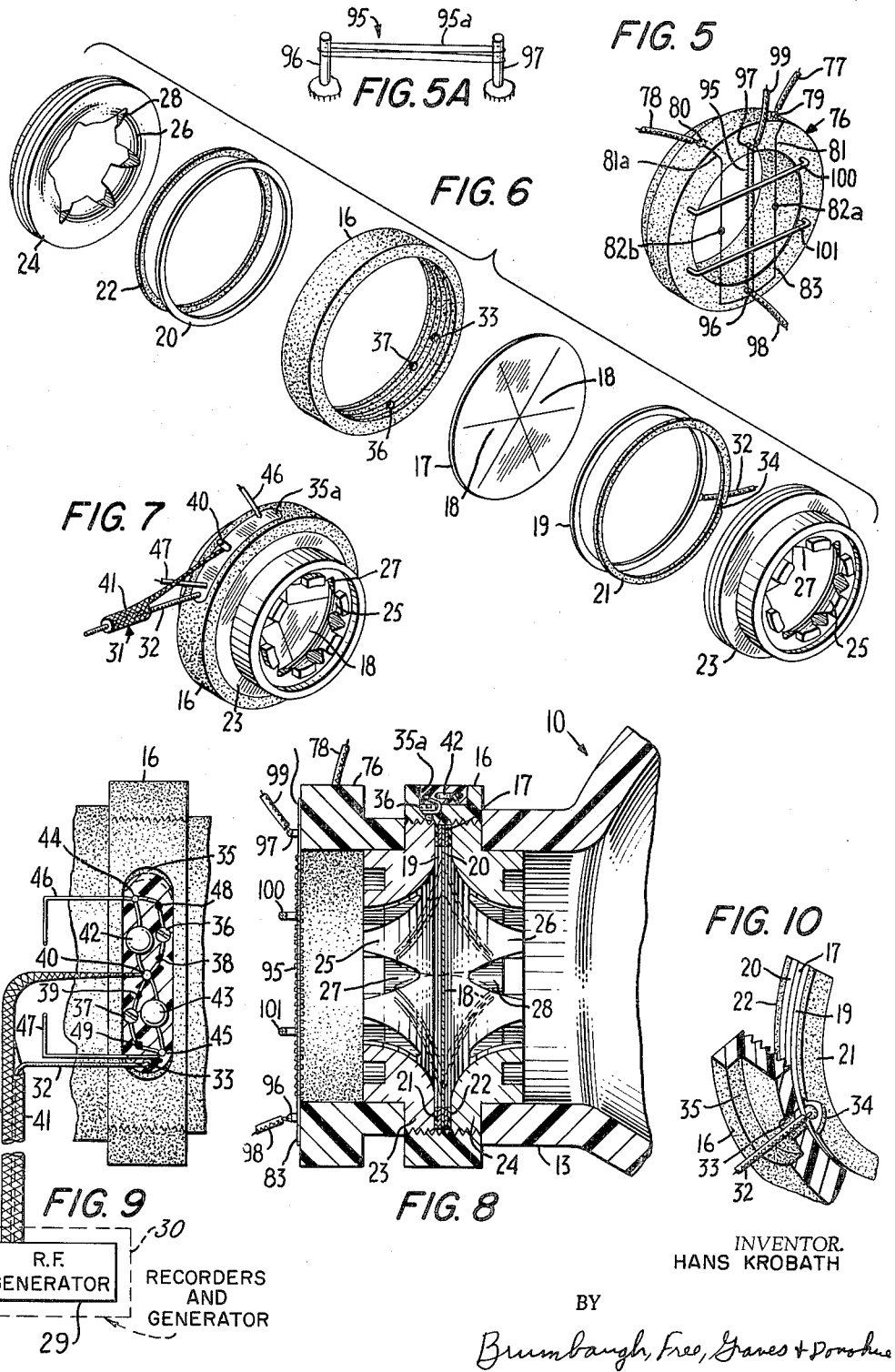

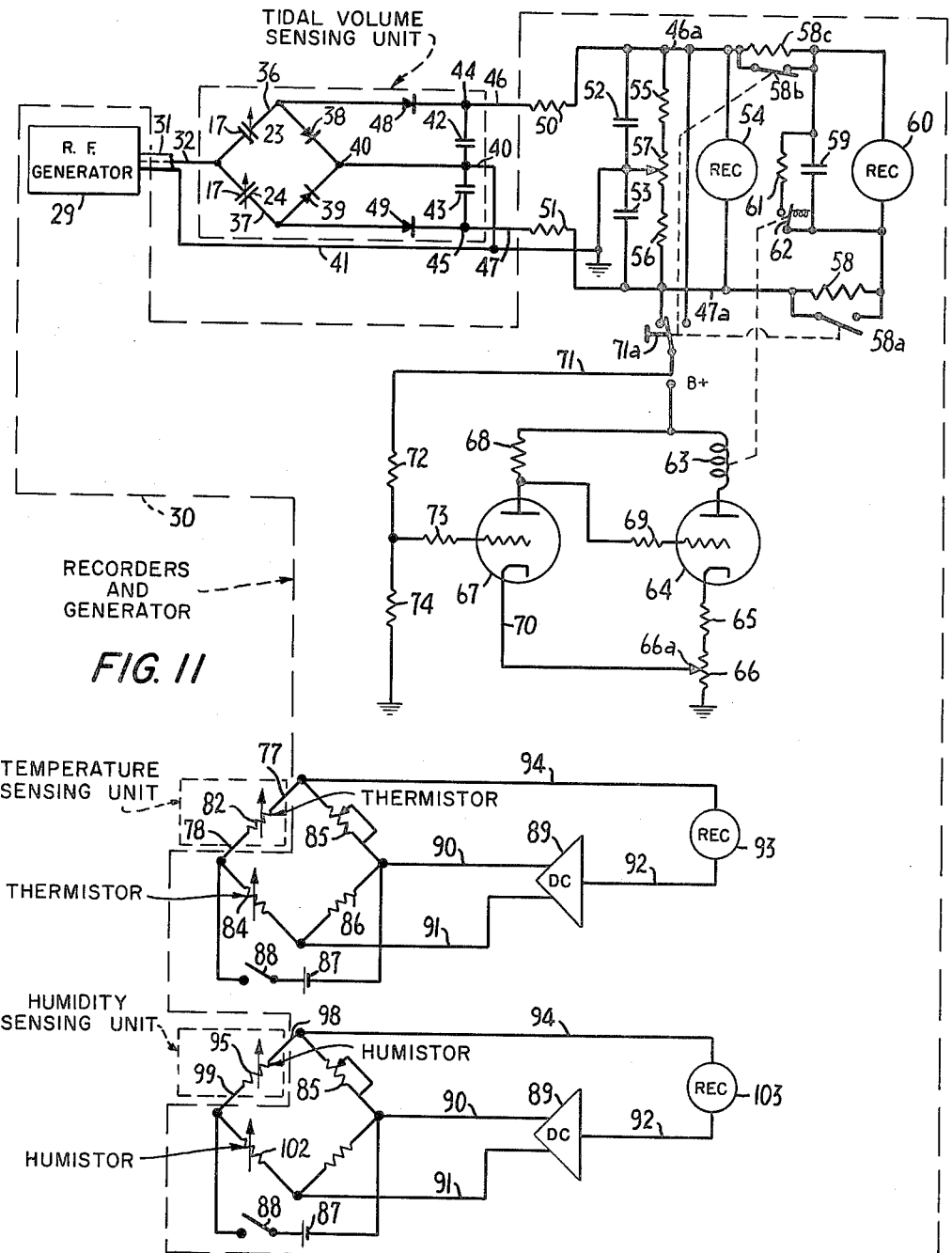

United States Patent Office 3,232,288
Patented Feb. 1, 1966

3,232,288
RESPIRATORY ANALYSIS INSTRUMENT
Hans Krobath, Glen Cove, N.Y., assignor to Human Resources Foundation, Albertson, Long Island, N.Y., a corporation of New York
Filed May 6, 1963, Ser. No. 278,209
13 Claims. (Cl. 128—2.08)

This invention relates to an instrument for determining modalities of respiration that will convey to an attending physician important information concerning a patient.

A respiratory pattern is of importance in showing the over-all health of a patient and, in particular, in indicating pulmonary and collateral conditions, such as heart failure, in which paroxysmal nocturnal dyspnea is the most sensitive sign of left ventricular failure. With the pattern of a respiratory cycle reproduced as a permanent record for the clinical chart of a patient, reference can be made to the record to evaluate the progress of a disease, to learn the status of the disease at any moment and, in some instances, to predict the future course of the disease.

It is especially important to measure, in order to detect and diagnose diseases, the volume of air which enters and leaves the lungs at each natural respiratory effort, referred to as tidal volume, as well as to detect and record the temperature and moisture content of the expired air. Attempts in the past to measure these modalities of respiration have resulted in bulky devices that could not be used over extended periods, such as nocturnally, and also devices so inaccurate that their indications were of little practical value. Moreover, the inaccuracies and costs of such prior devices have resulted in the failure of hospitals and doctors to adopt and recommend their use.

The present invention overcome the problems previously encountered in this field and provides a respiratory analysis instrument that generates readily recordable signals accurately portraying tidal volume, temperature and moisture content of inspired and expired air, as well as displaying the respiratory cycle duration. An important feature of the inventive instrument resides in its use of a relatively small nose cone readily attached without discomfort to a patient with a minimum of pick-up wires from the nose cone to a recording unit. Moreover, the configuration of the nose cone, which channels the air flow from both nostrils through an inlet-outlet passages, facilitates selective removal for cleaning and repair of devices that sense the various modalities of respiration. Furthermore, the nose cone lends itself to recording individually the various modalities of respiration.

A further important feature of the inventive instrument resides in the provision of a tidal volume sensing unit diaphragm formed of a number of thin, flexible and conductive leaves on each side of which a conductive member is positioned. Inspired and expired air passing through the diaphragm displaces the leaves to couple to the conductive members varying amounts of high frequency energy supplied to the diaphragm. Variations in the amplitude of the high frequency signals coupled to the conductive members provide a signal representative of the air flow through the nose cone. Moreover, a control circuit may be coupled to the conductive members to provide an indication of the tidal volume of air flowing through the cone only during one half of the respiratory cycle.

Yet another inportant feature of the invention resides in the use of a sensitive and fast acting moisture detector formed by strands of organic material upon which salt crystals have been deposited. The conductivity of the moisture detector varies with the amount of moisture in the air to which it is exposed, thereby providing accurate indications of the moisture content of expired air.

These and further advantages of the invention will be more readily understood when the following description is read in connection with the accompanying drawings, in which:

FIGURE 5 shows a perspective of temperature and moisture sensing units, removed from the nose cone, in accordance with the present invention;

FIGURE 5A illustrates the moisture sensing unit prior to its completion;

FIGURE 6 is an exploded view of a tidal volume sensing unit removed from the nose cone;

FIGURE 7 is a perspective view illustrating the tidal volume indicator in its assembled form prior to being positioned on the nose cone;

FIGURE 8 is a transverse section of an inlet-outlet passage in the nose cone with the sensing units of the respiratory analysis instrument in position;

FIGURE 9 is a partial elevation of the nose cone showing electrical circuits embedded in the tidal volume sensing unit;

FIGURE 10 is a fragmentary enlarged detail of a portion of the tidal volume unit;

FIGURE 11 is a circuit diagram showing the electrical circuits of the respiratory analysis instrument.

Figure 1:
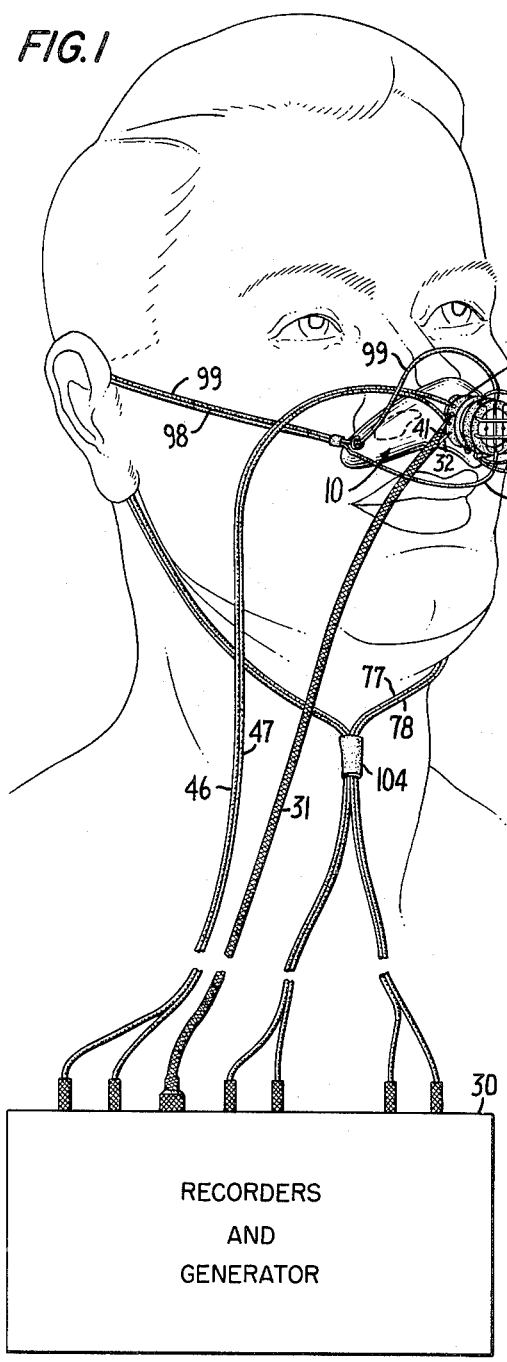
FIGURE 1 is a view in perspective of a respiratory analysis instrument embodying the principles of the present invention.
Figure 2:
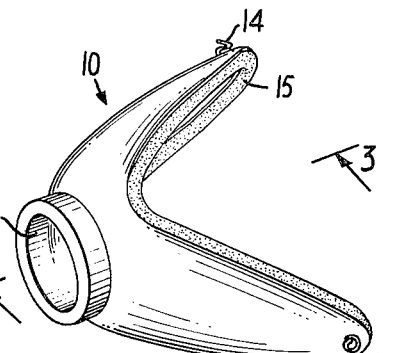
FIGURE 2 shows an enlarged perspective of a nose cone shown on a patient in FIGURE 1.
Figure 3:
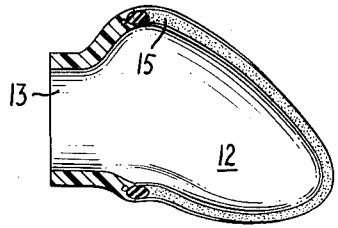
FIGURE 3 is a transverse section of the nose cone taken along the view line 3—3 of FIGURE 2 looking in the direction of the arrows.
Figure 4:
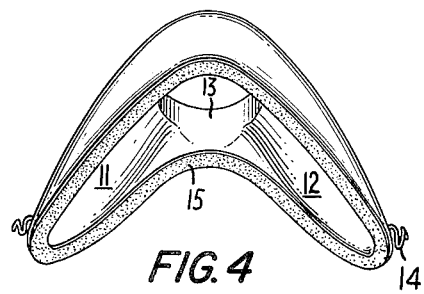
FIGURE 4 is a perspective view of the nose cone from another angle.

Referring to a typical embodiment of the invention in greater detail with reference to the drawings, a nose cone 10 is shown in position on a patient in FIGURE 1, and shown in greater detail in FIGURES 2, 3 and 4. The nose cone is formed by a pair of channels 11 and 12 associated with the wearer's left and right nostrils, respectively, which direct expired air through an inlet-outlet 13. With this configuration, substantially all inspired and expired air flows that the inlet-outlet 13 and the channels 11 and 12 to and from the patient's nostrils.

Hooks 14 on each extremity of the nose cone 10 anchor conductors associated with the instrument, when such conductors are twisted thereon, to hold the nose cone on the wearer, as described more fully hereinafter. An appropriately thick strip 15 of soft sponge material, such as rubber or plastic, contoured in any suitable manner, is provided around the edges of the nose cone 10 to prevent air leakage during use of the nose cone.

Referring next to a tidal volume sensing unit best shown in FIGURES 6, 7 and 8, a ring 16 formed of insulating material, and threaded on its interior surface, mounts a resilient and conductive diaphragm 17 formed by leaves 18. Conductive washers 19 and 20, of the same diameter as the diaphragm 17, engage its periphery on opposite sides. Insulating washers 21 and 22 outside of the conductive washers 19 and 20, respectively, are urged inwardly against the washers 19 and 20 by generally cylindrical conductive members 23 and 24 threaded on their exteriors to fit the interior of the ring 16. Flared surfaces 25 and 26 on the members 23 and 24 cooperate with the leaves 18 of the diaphragm 17, as will be discussed hereinafter. Notches 27 and 28 in the members 23 and 24 are cut in the flared surfaces 25 and 26, as desired, to reduce their effective areas.

The material forming the diaphragm 17 has a minimum of memory; i.e., great resiliency, so that each of the leaves 18 will return to the same rest position after being blown one way or the other by air flowing through the nose cone 10. Thin sheets of Mylar polyester film upon which aluminum has been deposited have provided satisfactory diaphragms.

The leaves 18 are cut and the flared surfaces 25 and 26 formed so that air passing through the inlet-outlet 13 and the ring 16 will displaced the leaves towards the flared surfaces but no contact will be made, as shown in dashed outlines in FIGURE 8, to provide variable capacity between the diaphragm and conductive members 23 and 24.

Examining the electrical circuits associated with the tidal volume unit with particular reference to FIGURES 9, 10 and 11, a radio frequency generator 29, physically incorporated in a recorders and generator unit 30 (FIGURE 1), is coupled through a coaxial cable 31 to the tidal volume sensing unit. An inner conductor 32 of the cable 31 extends through a small opening 33 in the ring 16 to the conductive washer 19 to which it is welded. A cut-away section 34 in the insulating washer 21 accommodates the spot-weld (FIGURE 10).

A recess 35 in the ring 16 carries various miniaturized circuit components associated with the tidal volume sensing unit, and following completion of the unit, a filler material 35a (FIGURE 7) encapsulates the circuits. Setscrews 36 and 37 extend from the bottom of the recess 35 into conductive contact with the members 23 and 24, respectively, and miniaturized diodes 38 and 39 are connected between the screws 36 and 37 and a common pin 40 joined to a grounded shield 41 of the coaxial cable 31. Miniaturized storage capacitors 42 and 43 are connected between the pin 40 and further junctions 44 and 45 from which extends output conductors 46 and 47. To complete the circuits in the ring 16, miniaturized diodes 48 and 49 are connected between the screw 36 and junction 44, and the screw 37 and the junction 45, respectively.

The output conductors 46 and 47 lead to the recorders and generator unit 30 in which signals are respectively coupled through resistors 50 and 51 (FIGURE 11) and across capacitors 52 and 53, joined to ground at their other sides to form filter networks with the resistors 50 and 51. The resulting filtered D.-C. signals are coupled through conductors 46a and 47a to a recorder 54. Resistors 55 and 56 are connected in series with a potentiometer 57 across the recorder 54, and the movable tap of the potentiometer is grounded to facilitate balancing of the two channels with respect to ground.

A resistor 58, bridged by a switch 58a, and a capacitor 59 connected to the conductor 46a through a switch 58b, bridging a resistor 58c, form an integrating circuit the output of which is supplied to a further recorder 60. In like manner the resistor 58c and capacitor 59 form an integrating circuit. The recorder 60 may therefore display directly the volume of air inspired, or expired, or both, with a high degree of accuracy, for example plus or minus 1 cubic centimeter.

When it is necessary to display on the recorder 60 the tidal volume of only one half of the respiratory cycle, a discharge resistor 61 is connected in series with a switch 62 across the integrating capacitor 59. The switch 62 is controlled by a relay coil 63 in the plate circuit of a triode 64 suitably biased by a fixed cathode resistor 65 and a potentiometer 66. A second triode 67, connected through a plate resistor 68 to a B+ supply, has its plate circuit coupled through a resistor 69 to the grid of the triode 64. The cathode circuit of the triode 67 is connected by a conductor 70 to a movable tap 66a on the potentiometer 66 in the cathode circuit of the triode 64, and the plate of the triode 64 is coupled through the relay coil 63 to the B+ supply to complete the circuit. A conductor 71 is selectively connected by a switch 71a, mechanically ganged with bridging switches 58a and 58b, to one of the conductors 46a and 47a to supply signals through resistors 72 and 73 to the grid of the triode 67. A further resistor 74 functions with the resistor 72 as a voltage divider to apply a signal of proper amplitude to the triode 67.

The relay switch 62 normally is biased to its open position. Assuming that the switch 71a is in the position shown in FIGURE 11, during inspiration the lead 47a will be positive with respect to the lead 46a (since the capacity between the diaphragm 17 and member 24 will be sharply increased) and the biasing of the triodes 64 and 67 is so arranged that current will flow through the triode 67, thereby cutting off the triode 64, and the switch 62 will remain open. Note that adjustment of the tap 66a on the potentiometer 66 facilitates proper operation of the control circuit for the switch 62. Accordingly the volume of inspired air will be displayed by the recorder 60. As soon as expiration commences, the lead 46a will become positive with respect to lead 47a thereby cutting off the triode 67 and causing conduction of the triode 64 to close the switch 62 and discharge the capacitor 59. During this interval the recorder 60 will not indicate tidal volume, but will only display the tidal volume of one half of the respiratory cycle.

If it is desired to record only the tidal volume of expired air, the switch 71a is moved to its right hand position which reverses all connections and results in the use of the resistor 58c and capacitor 59 as the integrating network. The diaphragm 17 will then be blown toward the member 23 and the conductor 46a will be positive with respect to the conductor 47a.

Rather than use the switching arrangement shown, a second control circuit may be used to operate the switch 62 in response to signals from the conductor 46a, if the illustrated control circuit operates in response to signals from the conductor 47a. The bridging switches 58a and 58b would then be ganged with a switch that connected one or the other of the control circuits to the conductors 46a and 47a.

Referring next to the sensing device and circuits used to indicate temperature, a ring 76 (FIGURE 5) formed of insulating material fits over the end of the member 23, as shown in FIGURE 8, and inspired and expired air passes through the ring. Conductors 77 and 78, connected to the unit 30, are anchored to pins 79 and 80 embedded in the ring 76. Thin wires 81 and 81a secured to the pins 79 and 80 lead to a pair of elements 82a and 82b forming a thermistor 82, the elements being joined by a further conductor 83. The thermistor 82 and associated conductors may be secured to the ring 76 by a suitable adhesive.

The thermistor 82 forms one leg of a bridge (FIGURE 11) the adjacent leg of which is preferably another similar thermistor 84 located in the unit 30 and exposed to the ambient temperature for compensation of the circuit. The bridge is completed by an adjustable resistor 85 and a fixed resistor 86. To energize the bridge, a suitable source of potential 87 is coupled through a switch 88 to opposite junctions of the bridge including the common junction of the thermistors 82 and 84. A differential D.-C. amplifier 89 is connected across the resistor 86 by conductors 90 and 91, the output of the D.-C. amplifier being coupled through a further conductor 92 to one side of the recorder 93. The other side of the recorder is coupled by a conductor 94 to the junction formed by the thermistor 82 and the resistor 85.

Also positioned on the ring 76, although it may be located on a separate ring, is a humistor 95 (shown much enlarged in diameter for clarity) extending between anchor pins 96 and 97 to which are attached output conductors 98 and 99, respectively. Insulated guards 100 and 101 across the ring 76 protect the thermistor and humistor units against accidental damage.

The humistor 95 is formed by fine strands of organic material, for example silk, on which minute salt crystals have been deposited to provide a resistance element varying with absorbed moisture. Expired air passing the humistor 95 increases its conductivity rapidly in proportion to the water vapor concentration. Conventional humistors cannot function in the nose cone 10 because of their excessively long time delay, usually greater than the entire respiratory cycle. Since the response of the humistor 95 is on the order of one-fifteenth of a second, for example, it provides accurate indications of the concentration of water vapor within each respiratory cycle.

An exemplary humistor 95 was formed by looping a single filament of silk 95a two times around a pair of spaced pins 96 and 97 about .0025 inch in diameter, as shown in FIGURE 5A. The size of the posts and spacing of the silk strands have been exaggerated in the interests of clarity. The assembly was immersed in a saturated Rochelle salt solution at room temperature until the silk was wetted, which required only a few seconds, removed and dried for 10 hours. Conductive silver paint was then spread over the pins 96 and 97 and the adjacent silk strands to insure a good electrical contact at their junction. A thin coating of celluloid dissolved in acetone (Glyptal) was applied over the conductive silver paint to prevent water vapor from interfering with the electrical contact between the posts and silk strands. The resulting unit provided a sensitive humistor acting far more rapidly than conventional humistors. Thus, one element had a resistance of about 50 megohms at a 50% humidity level and a time delay of about one-fifteenth of a second. If desired, other organic strands such as cotton may be used, and other salt crystals may also be formed on the strands, but the disclosed unit has been found preferable to all others.

To record the moisture content of exhaled air, the humistor 95 is conected into a bridge, as shown in FIGURE 11. Another identical humistor 102 in an adjacent leg of the bridge is placed in the recorder 30 and exposed to ambient moisture for compensation. The remainder of the bridge is identical to that described in connection with the thermistor 82 and has been designated with like reference numerals. The output signals are displayed by a further recorder 103 corresponding to the recorder 93.

To use the inventive respiration measuring instrument, the tidal volume sensing unit is grasped by the ring 16 and the smaller diameter portion of the member 24 forced into the inlet-outlet 13 of the nose cone 10. If it is also desired to measure the temperature and moisture content of expired air, the ring 76 bearing the temperature and moisture sensing units, is grasped and forced over the smaller diameter portion of the member 23, all as shown in FIGURE 8. With the various leads connected to the recorders and generator unit 30, the conductors 77 and 78 are secured to one of the nose cone hooks 14 and the conductors 98 and 99 to the other hook. The nose cone 10 may then be positioned over the nostrils of the wearer and the leads from the hooks 14 looped around his ears, as shown in FIGURE 1. To hold the nose cone 10 securely in position, a slidable collar 104 on the leads may be slipped up towards the neck. The instrument is now ready to record the modalities of respiration.

In operation, after the R.-F. generator 29 and the various recorders are energized by a conventional switch or switches (not shown), each time the patient exhales the recorders 54, 60, 93 and 103 will record tidal volume (if the switch 71a is in its right hand position), duration of the respiratory cycle, and temperature and moisture content of the expired air, respectively. If the switch 71a is in the position shown in FIGURE 11, the recorder 60 will display tidal volume on the next inspiration. Of course, the remaining recorders will also display the temperature and moisture content of inspired air.

The recorders 54, 60, 93 and 103 may be of the type used to display electrocardiograms. Moreover, an electrocardiogram may be taken simultaneously with the modalities sensed by the inventive instrument to provide still further information concerning the patient's health.

Figure 12:
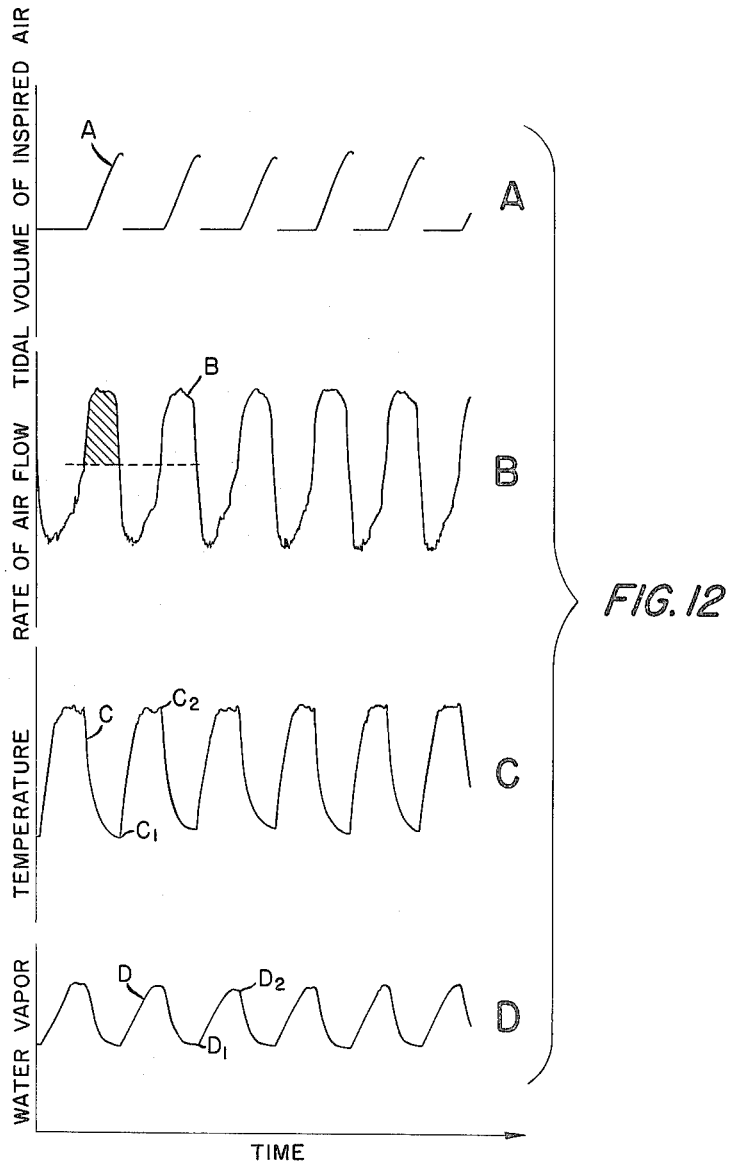
FIGURE 12 illustrates curves representative of modalities of respiration recorded by the inventive instrument.

To aid in understanding the modalities recorded by the inventive instrument, curves actually recorded during use of the nose cone 10, with the abscissa as time, have been reproduced in FIGURE 12.

Curve A from the recorder 60 shows the tidal volume of inspired air by displaying a signal integrated from the inspiratory phase of curve B above the dashed line. The first loop of curve A is the integral of the cross hatched area of curve B. The tidal volume of the expiratory phase is not recorded because the capacitor 59 is shunted by the resistor 61. With the switch 71a in its other position, the expiratory phase will be recorded.

Curve B from the recorder 54 displays the rate of flow of air to and from the lungs. Distortion and rest periods in this curve indicate certain muscular defects which result from particular diseases.

Curve C from the recorder 93 indicates the temperature of exhaled air. One cycle of the expiratory phase showing a rising temperature gradient occurs between the points of the curve designated $C_1$ and $C_2$.

Curve D from the recorder 103 shows the water vapor concentration of exhaled air over several respiratory cycles. The expiratory phase of one cycle occurs between the points marked $D_1$ and $D_2$.

Any one of the curves A to D may be used to determine the respiratory time cycle, and this information, together with the recorded modalities and an electrocardiograph, provides a comprehensive analysis of a patient.

It is apparent that the inventive instrument records accuately modalities of respiration that are of great importance to an examining physican in determining the present condition of a patient, the past effects of a particular disease, and in predicting, in some instances, the future course of a disease.

It will be understood that the above described embodiments of the invention are illustrative only and modifications thereof will occur to those skilled in the art. Therefore, the invention is not to be limited to the specific apparatus disclosed herein but is to be defined by the appended claims.

I claim:

1. A respiratory analysis instrument to provide modalities of respiration of a patient comprising a nose cone having an inlet-outlet adapted to communicate with the nostrils of the patient, a tidal volume sensing unit in the inlet-outlet of the nose cone; said tidal volume unit comprising a diaphragm formed of a plurality of resilient conductive leaves positioned to be displaceable by air flow through the cone, a conductive member spaced from each side of the diaphragm, the diaphragm cooperating electrically with each of the conductive members, means for supplying high frequency signals to the diaphragm, and circuit means responsive to variations in the amplitude of the high frequency signals coupled to the conductive members from the diaphragm to generate a signal representative of air flow through the nose cone.

2. An instrument as defined in claim 1, wherein a moisture sensitive element is positioned in the inlet-outlet of the nose cone, and means are connected to the moisture sensitive element to generate an electrical signal representative of moisture in the air flowing through the nose cone.

3. An instrument as defined in claim 1, wherein a temperature sensitive element is positioned in the inlet-outlet of the nose cone, and means are connected to the temperature sensitive element to generate an electrical signal representative of the temperature of the air flowing through the nose cone.

4. A tidal volume sensing unit comprising means forming an air channel, a diaphragm formed of a plurality of resilient conductive leaves positioned across the air channel, a first conductive member forming a portion of the air channel and spaced from one side of the diaphragm, and a second conductive member forming a portion of the air channel and spaced from the other side of the diaphragm, the diaphragm forming two capacitors with the first and second conductive members, whereby air flowing through the air channel will vary the capacitance of the two capacitors.

5. A tidal volume sensing unit as defined in claim 4, wherein the conductive members are formed with surfaces that flare away from the diaphragm and into the air channel.

6. A tidal volume sensing unit as defined in claim 4, wherein an insulating housing helps support the diaphragm, and miniaturized electrical circuit elements are embedded in the housing and connected to the conductive members.

7. A tidal volume sensing unit comprising an insulating ring threaded on its interior surface, a diaphragm formed of a plurality of resilient conductive leaves positioned in the ring, a first conductive member threaded on its exterior surface fitting the ring on one side of the diaphragm and spaced therefrom by insulating means, and a second conductive member threaded on its exterior surface fitting the ring on the other side of the diaphragm and spaced therefrom by insulating means, the diaphragm forming two capacitors with the first and second conductive members, whereby air flowing through the diaphragm will vary the capacitance of the two capacitors.

8. A tidal volume sensing unit as defined in claim 7, wherein the conductive members are formed with surfaces that flare away from the diaphragm.

9. A tidal volume sensing unit as defined in claim 7, wherein miniaturized electrical circuit units are embedded in the ring and connected to the conductive members.

10. A respiratory analysis instrument to provide modalities of respiration of a patient comprising a nose cone having an inlet-outlet adapted to communicate with both nostrils of the patient, a tidal volume sensing unit in the inlet-outlet of the nose cone to generate signals representative of air flow through the cone, and means responsive to said signals to provide a signal representative of the tidal volume of air flowing through the cone during one-half of the respiratory cycle.

11. An instrument as defined in claim 10, wherein the responsive means includes an integrating circuit and a control circuit, and the control circuit is responsive to the signals representative of air flow to render the integrating circuit operative only during one-half of the respiratory cycle.

12. A respiratory analysis instrument to provide modalities of respiration of a patient comprising a nose cone having an inlet-outlet adapted to communicate with both nostrils of the patient, a tidal volume sensing unit in the inlet-outlet of the nose cone; said tidal volume unit comprising a diaphragm formed of a plurality of resilient and conductive leaves displaceable by air flow through the cone, a conductive member spaced from each side of the diaphragm, means for supplying high frequency signals to the diaphragm, and means including a control circuit responsive to variations in the amplitude of the high frequency signals coupled to the conductive members from the diaphragm to generate a signal representative of the tidal volume of air flowing through the cone during one-half of the respiratory cycle.

13. An instrument as defined in claim 12, wherein the responsive means includes an integrating circuit, and the control circuit is responsive to said variations in the high frequency signals to render the integrating circuit operative only during one-half of the respiratory cycle.

References Cited by the Examiner

UNITED STATES PATENTS

| | | | |
|---|---|---|---|
| 2,569,849 | 10/1951 | Emerson | 128—2.08 |
| 2,848,306 | 8/1958 | Blumer | 23—232 |
| 3,000,377 | 9/1961 | Tolbert | 128—2.07 |
| 3,057,693 | 10/1962 | Barnes | 23—232 |
| 3,081,766 | 3/1963 | Dubsky | 128—2.08 |
| 3,082,761 | 3/1963 | Engelder | 128—2.07 |
| 3,097,638 | 7/1963 | Streimer | 128—2.07 |

RICHARD A. GAUDET, *Primary Examiner.*

LOUIS R. PRINCE, *Examiner.*